United States Patent
Pai et al.

(10) Patent No.: US 10,667,240 B2
(45) Date of Patent: May 26, 2020

(54) DEVICE, SYSTEM AND METHOD FOR MANAGING CHANNEL AND/OR TALKGROUP ASSIGNMENTS

(71) Applicant: MOTOROLA SOLUTIONS, INC., Chicago, IL (US)

(72) Inventors: Madhusudan K. Pai, Palatine, IL (US); Scott J. Pappas, Lake Zurich, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 61 days.

(21) Appl. No.: 15/977,442

(22) Filed: May 11, 2018

(65) Prior Publication Data

US 2019/0349894 A1    Nov. 14, 2019

(51) Int. Cl.
     *H04W 72/02*      (2009.01)
     *H04W 72/12*      (2009.01)
     *H04W 72/04*      (2009.01)

(52) U.S. Cl.
     CPC ....... *H04W 72/02* (2013.01); *H04W 72/1247* (2013.01); *H04W 72/0453* (2013.01)

(58) Field of Classification Search
     CPC . H04W 72/02; H04W 72/04; H04W 72/0406; H04W 72/042; H04W 72/0453; H04W 72/048; H04W 72/121; H04W 72/1247
     See application file for complete search history.

(56) References Cited

U.S. PATENT DOCUMENTS

| | | | |
|---|---|---|---|
| 9,686,656 B2 | 6/2017 | Pai et al. | |
| 2012/0278385 A1* | 11/2012 | Papakipos | H04L 12/6418 709/204 |
| 2016/0191482 A1* | 6/2016 | Truelove | H04L 63/0807 726/9 |
| 2016/0234663 A1* | 8/2016 | Tillet | H04B 7/18513 |

FOREIGN PATENT DOCUMENTS

| | | |
|---|---|---|
| EP | 1569486 A1 | 8/2005 |
| GB | 2541293 A | 2/2017 |
| WO | WO-2019070400 A2 | 4/2019 |

OTHER PUBLICATIONS

UKIPO, Search Report under Section 17, dated Oct. 10, 2019, re UK Patent Application No. 1905813.0.

* cited by examiner

*Primary Examiner* — Khoa Huynh
(74) *Attorney, Agent, or Firm* — Perry + Currier, Inc.

(57) ABSTRACT

A device, system and method for managing channel and/or talkgroup assignments is provided. A memory stores: a first list of channels associated with a device identifier of a mobile device; and a second list of channels associated with: a user identifier of a user; and attributes of the user. A controller: receives, via a communications unit, from the mobile device, the user identifier indicating a log-in to the mobile device by the user; selects a subset of the first list of channels, to be temporarily assigned to the mobile device when the user is logged into the mobile device, based on the attributes of the user; and transmits, via the communications unit, to the mobile device, a combined list that includes the subset of the first list of channels, and the second list of channels, to enable the mobile device to communicate using channels in the combined list.

20 Claims, 6 Drawing Sheets

DEVICE, SYSTEM AND METHOD FOR MANAGING CHANNEL AND/OR TALKGROUP ASSIGNMENTS

BACKGROUND OF THE INVENTION

Devices associated with a public safety agency may be generally provisioned to communicate using specific channels and/or talkgroups, for example channels and/or talkgroups used for communicating across and/or within various public safety agencies (e.g. police agencies, fire fighter agencies, emergency medical agencies), and the like. Hence, when a device logs into a network, such channels and/or talkgroups may be assigned to the device. However, when a user logs into the device, the device and/or the user may have channels and/or talkgroups assigned which are associated with the user, which may limit the ability of the device and/or the user to communicate.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
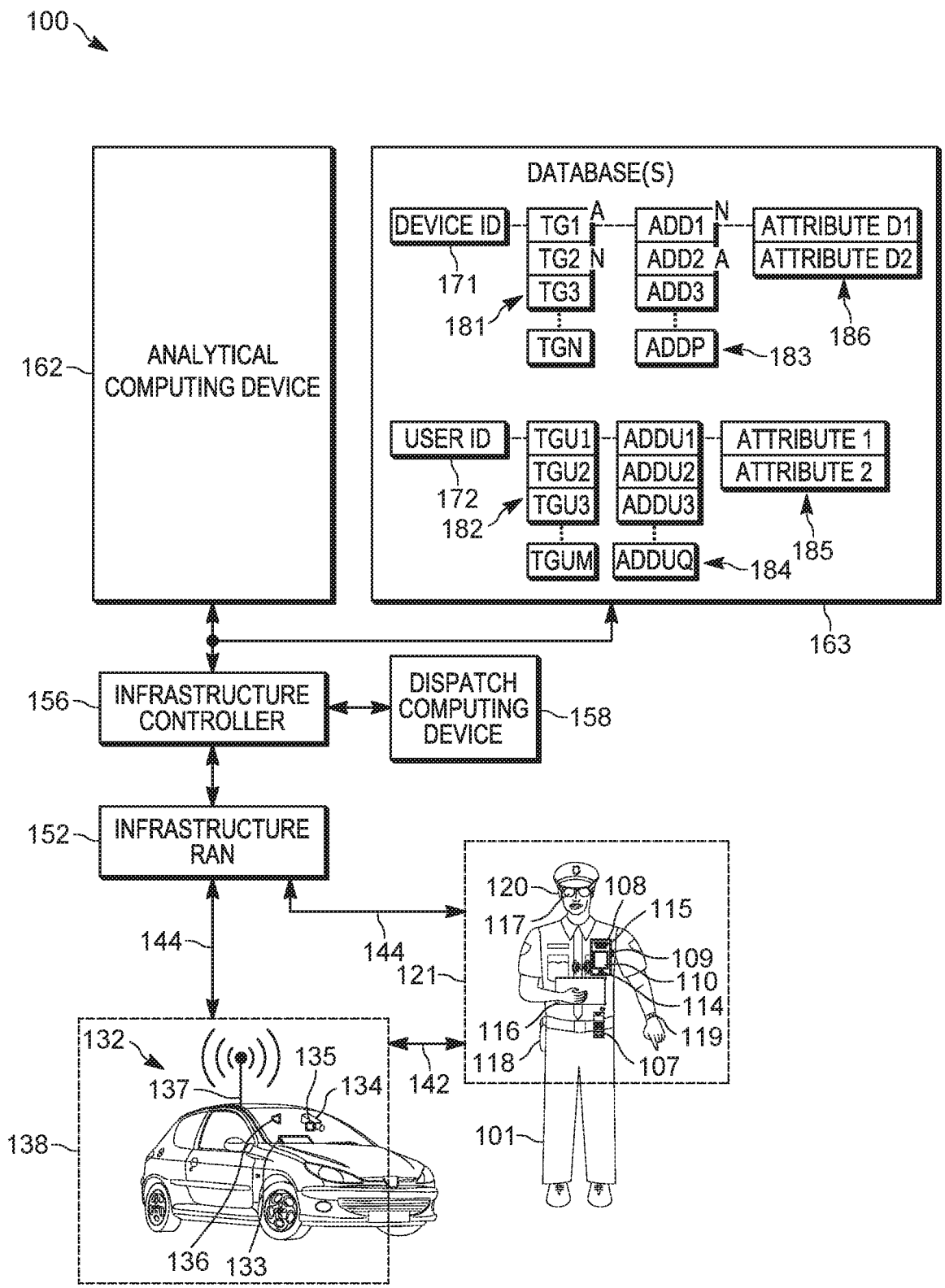
FIG. 1 is a system for managing channel and/or talkgroup assignments in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the present specification provides a device comprising: a communications unit; and a controller communicatively coupled to the communications unit, the controller having access to a memory storing: a first list of channels associated with a device identifier that identifies a mobile device; and a second list of channels associated with a user identifier that identifies a user, the user identifier further associated with one or more attributes of the user; the controller configured to: receive, via the communications unit, from the mobile device, the user identifier indicating a log-in to the mobile device by the user; select a subset of the first list of channels, to be temporarily assigned to the mobile device when the user is logged into the mobile device, based on the one or more attributes of the user; and transmit, via the communications unit, to the mobile device, a combined list that includes the subset of the first list of channels, and the second list of channels, to enable the mobile device to communicate using channels in the combined list.

Another aspect of the present specification provides a method comprising: receiving, at a controller, from a mobile device, a user identifier indicating a log-in to the mobile device by a user, the controller having access to a memory storing: a first list of channels associated with a device identifier that identifies the mobile device; and a second list of channels associated with the user identifier that identifies the user, the user identifier further associated with one or more attributes of the user; selecting, at the controller, a subset of the first list of channels, to be temporarily assigned to the mobile device when the user is logged into the mobile device, based on the one or more attributes of the user; and transmitting, using the controller, to the mobile device, a combined list that includes the subset of the first list of channels, and the second list of channels, to enable the mobile device to communicate using channels in the combined list.

Attention is directed to FIG. 1, which depicts a system 100 for managing channel and/or talkgroup assignments. For example, as depicted, the system 100 may manage channel and/or talkgroup assignments of one or more mobile devices assigned to a user 101. While present embodiments are described with respect to the user 101 being a police officer, the user 101 may be another type of first responder and/or public safety user including, but not limited to, police of other ranks and/or types and/or roles, a fire fighter, an emergency medical worker, and the like.

For example, a mobile device may initially log into a computing device and/or network of the system 100 prior to the user 101 logging into the device, for example when the mobile device is turned on. The system 100 may assign a first list of channels, associated with a device identifier that identifies the mobile device, to the mobile device, which may enable the user 101 to communicate with other devices, using the channels in the first list of channels, without also logging into the mobile device. However, when the user 101 logs into the mobile device, using a user identifier, the system 100 may select a subset of the first list of channels, to be temporarily assigned to the mobile device when the user 101 is logged into the mobile device, based on one or more attributes of the user 101. The subset of the first list of channels is assigned to the mobile device, as well as a second list of channels associated with the user identifier that identifies the user. Hence, the mobile device, when logged into by the user 101, may inherit the subset of the first list of channels.

Similarly, the system 100 may assign a third list of addresses, associated with the device identifier, to the mobile device, prior to the user logging into the mobile device and, when the user logs into the mobile device, select a further subset of the third list of addresses, to be temporarily assigned to the mobile device, based on the one or more attributes of the user. The subset of the third list of addresses is assigned to the mobile device, as well as a fourth list of addresses associated with the user identifier. Hence, the mobile device, when logged into the by the user 101, may inherit the subset of the third list of addresses. These processes and the addresses are described below.

The system 100 is next described in further detail. As depicted, the system 100 includes one or more devices assigned to a user 101, for example that the user 101 may wear. The one or more devices assigned to the user 101 may include one device, such as a primary battery-powered portable radio 107 (including, but not limited to, a smartphone, and the like), used for narrowband and/or broadband direct-mode or infrastructure communications, or more than one device. Such devices may be referred to as edge devices as they are located not in the "cloud" but at the "edge" of a network and/or the "cloud. For example, an edge device may be a device which provides an entry point into a communication network and which may include, but is not limited to, phones, smartphones, radios, but also routers, routing switches, integrated access devices (IADs), multiplexers, and a variety of metropolitan area network (MAN) and wide area network (WAN) access devices. As such, the user 101 may alternatively be referred to as an operator of an edge device.

Such devices may further include, a battery-powered radio speaker microphone (RSM) video capture device 108 (which includes a push-to-talk (PTT) switch 109, a display screen 110 and a video camera 114 and a microphone 115 (which may be a component of a speaker/microphone assembly). As depicted, the one or more devices assigned to the user 101 includes a laptop 116 which may include an integrated video camera and/or microphone and/or speaker and used for data applications such as incident support applications. As depicted the one or more devices assigned to the user 101 includes smart glasses 117 (e.g. which may be virtual reality, augmented reality, or mixed reality glasses and which may include an integrated video camera and/or microphone and/or speaker), a sensor-enabled holster 118, and/or a biometric sensor wristband 119 and/or a headphone 120.

The portable radio 107, the RSM video capture device 108, the laptop 116, smart glasses 117, the sensor-enabled holster 118, and/or the biometric sensor wristband 119 and/or the headphone 120 may form a personal area network (PAN) 121 of the user 101 via corresponding short-range PAN transceivers, which may be based on a Bluetooth™, Zigbee™, WiFi or other short-range wireless protocol having a transmission range on the order of meters, tens of meters, or hundreds of meters.

Although FIG. 1 illustrates the user 101 with a respective one or more devices assigned to the user 101, in other embodiments, the user 101 may include additional sets of same or similar devices, and additional persons and/or first responders may be present, with respective additional sets of same or similar devices (wherein communication devices of the user 101 and the other users may form a talkgroup of related users).

The system 100 may also include a vehicle 132 associated with the user 101 having an integrated mobile communication device 133, an associated vehicular video camera 134, and/or an associated microphone 135 (which may be a component of the video camera 134 or a component separate from the video camera 134), a speaker 136 and a coupled vehicular transceiver 137 which may form a vehicle area network (VAN) 138. The devices of the VAN 138 may also be assigned to the user 101 and furthermore the VAN 138 may be a component of the PAN 121. Other components of the VAN 138 may include, but are not limited to, an ignition of the vehicle 132, locks of the vehicle 132, and the like.

Although FIG. 1 illustrates only a single vehicle 132 with a single mobile communication device 133, respective single vehicular video camera 134 and/or microphone 135, and single coupled vehicular transceiver 137, in other embodiments, the vehicle 132 may include additional same or similar mobile communication devices, video cameras, microphones, speakers, and/or transceivers, and additional vehicles may be present with respective additional sets of mobile communication devices, video cameras, speakers, microphones, and/or transceivers.

Each of the portable radio 107, the RSM video capture device 108, the laptop 116, and/or the PAN 121 and the vehicular mobile communication device 133 and/or the VAN 138 may be configured for directly wirelessly communicating via direct-mode wireless link(s) 142, and/or may be configured for wirelessly communicating over respective wireless link(s) 144 via a wireless infrastructure radio access network (RAN) 152 (described in more detail below) and via corresponding transceiver circuits. These devices may be referred to as communication devices and are configured to receive inputs associated with the user 101 and/or provide outputs to the user 101 in addition to communicating information to and from other communication devices and the infrastructure RAN 152.

The portable radio 107, may be any communication device used for infrastructure RAN or direct-mode media (e.g., voice, audio, video, etc.) communication via a long-range wireless transmitter and/or transceiver that has a transmitter transmit range on the order of miles, e.g., 0.5-50 miles, or 3-20 miles (i.e., long-range in comparison to a short-range transmitter such as a Bluetooth™, Zigbee™, or NFC (near field communication) transmitter) with other communication devices and/or an infrastructure RAN. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long-range transmitter may implement a Long-Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long-range transmitter may implement a Wi-Fi protocol, for example in accordance with an IEEE 802.11 standard (e.g., 802.11a, 802.11b, 802.11g) or a WiMAX (Worldwide Interoperability for Microwave Access) protocol, for example operating in accordance with an IEEE 802.16 standard.

In the example of FIG. 1, the portable radio 107 may form the hub of communication connectivity for the user 101, through which other accessory devices, such as a biometric sensor (for example, the biometric sensor wristband 119), an activity tracker, a weapon status sensor (for example, the sensor-enabled holster 118), a heads-up-display (for example, the smart glasses 117), the RSM video capture device 108, and/or the laptop 116 and/or the headphone 120 may be communicatively coupled. In other words, the portable radio 107 may form the hub of the PAN 121.

In order to communicate with and exchange video, audio, and other media and communications with the RSM video capture device 108, laptop 116, and/or smart glasses 117 and/or headphone 120, the portable radio 107 may contain one or more physical electronic ports (such as a USB (Universal Serial Bus) port, an Ethernet port, an audio jack, etc.) for direct electronic coupling with the RSM video capture device 108, laptop 116, and/or smart glasses 117 and/or headphone 120. In some embodiments, the portable radio 107 may contain a short-range transmitter (i.e., short-range in comparison to the long-range transmitter such as a LMR or broadband transmitter) and/or transceiver for wirelessly coupling with the RSM video capture device 108, laptop 116, and/or smart glasses 117 and/or headphone 120. The short-range transmitter may be a Bluetooth™, Zigbee™, WiFi or NFC transmitter having a transmit range on the order of 0.01-100 meters, or 0.1-10 meters. In other embodiments, the RSM video capture device 108, the laptop 116, and/or the smart glasses 117 and/or headphone 120 may contain their own long-range transceivers and may communicate with one another and/or with the infrastructure RAN 152 or vehicular transceiver 137 directly without passing through portable radio 107.

The RSM video capture device 108 provides voice functionality features similar to a traditional RSM, including one or more of acting as a remote microphone (e.g. via the microphone 115) that is closer to the mouth of the user 101, providing a remote speaker (e.g. integrated with the microphone 115) allowing playback of audio closer to the ear of the user 101, and including the PTT switch 109 or other type of PTT input. The voice and/or audio recorded at the remote microphone 115 may be provided to the portable radio 107 for storage and/or analysis or for further transmission to other mobile communication devices or the infrastructure RAN 152, or may be directly transmitted by the RSM video capture device 108 to other communication devices or to the infrastructure RAN 152. The voice and/or audio played back at the remote speaker may be received from the portable radio 107 or received directly from one or more other communication devices or the infrastructure RAN 152. The RSM video capture device 108 may include the separate physical PTT switch 109 that functions, in cooperation with the portable radio 107 or on its own, to maintain the portable radio 107 and/or RSM video capture device 108 in a monitor only mode, and which switches the device(s) to a transmit-only mode (for half-duplex devices) or transmit and receive mode (for full-duplex devices) upon depression or activation of the PTT switch 109. The portable radio 107 and/or RSM video capture device 108 may form part of a group communications architecture that allows a single communication device to communicate with one or more group members (i.e., talkgroup members not shown in FIG. 1) associated with a particular group of devices at a same time.

Additional features may be provided at the RSM video capture device 108 as well. For example, as depicted, the display screen 110 may be provided for displaying images, video, and/or text to the user 101 or to someone else. The display screen 110 may be, for example, a liquid crystal display (LCD) screen or an organic light emitting display (OLED) display screen, and the like. In some embodiments, a touch sensitive input interface may be incorporated into the display screen 110 as well, allowing the user 101 to interact with content provided on the display screen 110. However, the display screen 110 may be optional. A soft PTT input may also be provided, for example, via such a touch interface.

The video camera 114 may also be provided at the RSM video capture device 108, integrating an ability to capture images and/or video and store the captured image data (for further analysis) or transmit the captured image data as an image or video stream to the portable radio 107 and/or to other communication devices or to the infrastructure RAN 152 directly. The video camera 114 and RSM remote microphone 115 may be used, for example, for capturing audio and/or video of a field-of-view associated with the user 101, and/or surroundings of the user 101. The microphone 115 of the RSM video capture device 108 may be an omni-directional or unidirectional microphone or array of omni-directional or unidirectional microphones that may configured for identifying a direction from which a captured sound emanated.

In some embodiments, the RSM video capture device 108 may be replaced with a more limited body worn camera that may include the video camera 114 and/or microphone 115 noted above for capturing audio and/or video, but may forego one or more of the features noted above that transform the body worn camera into a more full featured RSM, such as the separate physical PTT switch 109 and the display screen 110, remote microphone functionality for voice communications in cooperation with portable radio 107, and remote speaker.

The laptop 116, in particular, may be any wireless communication device used for infrastructure RAN or direct-mode media communication via a long-range or short-range wireless transmitter with other communication devices and/or the infrastructure RAN 152. The laptop 116 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 116 display screen may be, for example, an LCD screen or an OLED display screen, and the like. In some embodiments, a touch sensitive input interface may be incorporated into the display screen as well, allowing the user 101 to interact with content provided on the display screen. A soft PTT input may also be provided, for example, via such a touch interface. However, the laptop 116 may be optional as carrying a laptop during a public safety incident may be challenging for the user 101.

Front and/or rear-facing video cameras (not depicted), as well as one or more microphones) may also be provided at the laptop 116, integrating an ability to capture video and/or audio of the user 101 and surroundings, and store and/or otherwise process the captured video and/or audio for further analysis or transmit the captured video and/or audio as a video and/or audio stream to the portable radio 107, other communication devices, and/or the infrastructure RAN 152 for further analysis.

The headphone 120 may comprise an in-ear or over-the ear earpiece and may be present for providing audio to the user 101 in a private fashion that is not accessible to other users nearby the user 101. The headphone 120 may be wiredly or wirelessly communicatively coupled to one or both of the RSM video capture device 108 and the portable radio 107, which may be configured to provide audio received from the infrastructure RAN 152 and/or from other users to the user 101 based on a manual configuration of the RSM video capture device 108 or the portable radio 107, or based on some automatic routing mechanism at the one of the RSM video capture device 108 and the portable radio 107 that may route all audio to the earpiece or headphone 120 whenever it is detected as connected to the one of the RSM video capture device 108 and the portable radio 107, or may selectively route audio received at the one of the RSM video capture device 108 and the portable radio 107 to the earpiece or headphone 120 based on various contextual parameters, such as a content of the received audio, an identity of who sent the received audio, a covert status of the user 101, an incident status of the user 101, a determination of nearby users associated with the user 101, or some other contextual parameter.

The smart glasses 117 may include a digital imaging device, an electronic processor, a short-range and/or long-range transceiver device, and/or a projecting device and/or one or more microphones. The smart glasses 117 may maintain a bi-directional connection with the portable radio 107 and provide an always-on or on-demand video feed pointed in a direction of a gaze of the user 101 via the digital imaging device, and/or may provide a personal display via the projection device integrated into the smart glasses 117 for displaying information such as text, images, or video received from the portable radio 107 or directly from the infrastructure RAN 152. In some embodiments, the smart glasses 117 may include its own long-range transceiver and may communicate with other communication devices and/or with the infrastructure RAN 152 or vehicular transceiver 137 directly without passing through portable radio 107. In other embodiments, an additional user interface mechanism such as a touch interface or gesture detection mechanism may be provided at the smart glasses 117 that allows the user 101 to interact with the display elements displayed on the smart glasses 117 or projected into the eyes of the user 101, or to modify operation of the digital imaging device. In still other embodiments, a display and input interface at the portable radio 107 may be provided for interacting with smart glasses 117 content and modifying operation of the digital imaging device, among other possibilities.

The smart glasses 117 may provide a virtual reality interface in which a computer-simulated reality electronically replicates an environment with which the user 101 may interact. In some embodiments, the smart glasses 117 may provide an augmented reality interface in which a direct or indirect view of real-world environments in which the user is currently disposed are augmented (i.e., supplemented, by additional computer-generated sensory input such as sound, video, images, graphics, GPS data, or other information). In still other embodiments, the smart glasses 117 may provide a mixed reality interface in which electronically generated objects are inserted in a direct or indirect view of real-world environments in a manner such that they may co-exist and interact in real time with the real-world environment and real-world objects.

The sensor-enabled holster 118 may be an active (powered) or passive (non-powered) sensor that maintains and/or provides state information regarding a weapon or other item normally disposed within the sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 107 via its short-range transceiver. In some embodiments, the sensor-enabled holster 118 may also detect whether the first responder's hand is resting on the weapon even if it has not yet been removed from the holster and provide such information to portable radio 107. Other possibilities exist as well.

The biometric sensor wristband 119 may be an electronic device for tracking an activity of the user 101 or a health contextual condition of the user 101, and may include one or more movement sensors (such as an accelerometer, magnetometer, and/or gyroscope) that may periodically or intermittently provide to the portable radio 107 indications of orientation, direction, steps, acceleration, and/or speed, and indications of health such as one or more of a captured heart rate, a captured breathing rate, and a captured body temperature of the user 101, which may accompany other information. In some embodiments, the biometric sensor wristband 119 may include its own long-range transceiver and may communicate with other communication devices and/or with the infrastructure RAN 152 or vehicular transceiver 137 directly without passing through portable radio 107.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 119 itself, or disposed separately and communicate with the sensor wristband 119 via a short-range wireless or wired connection. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short-range wireless connection, among other possibilities.

Although the biometric sensor wristband 119 is shown in FIG. 1 as a bracelet worn around the wrist, in other examples, the biometric sensor wristband 119 may additionally and/or alternatively be worn around another part of the body, or may take a different physical form including an earring, a finger ring, a necklace, a glove, a belt, or some other type of wearable, ingestible, or insertable form factor.

The portable radio 107 and/or RSM video capture device 108 (or any other electronic device in FIG. 1, for that matter) may each include a location determination device integrated with or separately disposed in the portable radio 107 and/or RSM video capture device 108 and/or in respective receivers, transmitters, or transceivers of the portable radio 107 and RSM video capture device 108 for determining a location of the portable radio 107 and RSM video capture device 108. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 101 may include the mobile communication device 133, the vehicular video camera 134 and/or microphone 135, and the vehicular transceiver 137, all of which may be coupled to one another via a wired and/or wireless VAN 138 (and/or with any other further sensors physically or communicatively coupled to the vehicle 132). The vehicular transceiver 137 may include a long-range transceiver for directly wirelessly communicating with communication devices such as the portable radio 107, the RSM video capture device 108, and the laptop 116 via wireless link(s) 142 and/or for wirelessly communicating with the RAN via wireless link(s) 144. The vehicular transceiver 137 may further include a short-range wireless transceiver or wired transceiver for communicatively coupling between the mobile communication device 133 and/or the vehicular video camera 134 and/or the microphone 135 in the VAN 138. The mobile communication device 133 may, in some embodiments, include the vehicular transceiver 137 and/or the vehicular video camera 134 and/or the microphone 135 integrated therewith, and may operate to store and/or process video and/or audio produced by the video camera 134 and/or transmit the captured video and/or audio as a video and/or audio stream to the portable radio 107, other communication devices, and/or an infrastructure RAN 152 (described below) for further analysis. The microphone 135 may comprise an omni-directional or unidirectional microphone 135, or an array thereof, may be integrated in the video camera 134 and/or at the mobile communication device 133 (or additionally or alternatively made available at a separate location of the vehicle 132) and communicably coupled to the mobile communication device 133 and/or vehicular transceiver 137 for capturing audio and storing, processing, and/or transmitting the audio in a same or similar manner as set forth above with respect to the RSM video capture device 108.

Although FIG. 1 illustrates the vehicular video camera 134 and microphone 135 as being placed inside the vehicle 132, in other embodiments, one or both of the vehicular video camera 134 and microphone 135 may be placed at visible or hidden locations outside of the vehicle 132, such as within a vehicular grill portion or bumper portion, or on a roof portion, of the vehicle 132. Further, although FIG. 1 illustrates the speaker 136 as being placed inside of the vehicle 132 and coupled to the mobile communication device 133, in other embodiments, multiple speakers may be provided inside and/or outside of the vehicle 132 (all addressed simultaneously or individually addressable for outputting separate audio streams), or the single speaker 136 may be placed outside of the vehicle and function as a PA (public address) speaker, among other possibilities.

The vehicle 132 may be a human-operable vehicle, or may be a self-driving vehicle operable under control of mobile communication device 133 and optionally in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN 138 and/or the PAN (when the PAN is in range of the VAN 138 or via infrastructure RAN link of the VAN 138).

The vehicle 132 and/or transceiver 137, similar to the portable radio 107 and/or respective receivers, transmitters, or transceivers thereof, may include a location (and/or orientation) determination device integrated with or separately disposed in the mobile communication device 133 and/or transceiver 137 for determining (and storing and/or transmitting) a location (and/or orientation) of the vehicle 132.

In some embodiments, instead of a vehicle 132, a land, air, or water-based drone and/or self-driving vehicle and/or self-navigating vehicle and/or autonomous vehicle and/or robotic device, and the like, with the same or similar audio and/or video and communications capabilities and the same or similar self-navigating capabilities as set forth above may be disposed, and may similarly communicate with the PAN 121 and/or with the infrastructure RAN 152 to support the user 101 in the field.

The VAN 138 may communicatively couple with the PAN 121, disclosed above, when the VAN 138 and the PAN 121 come within wireless transmission range of one another, which may include an authentication that takes place there between. In some embodiments, one of the VAN 138 and the PAN 121 may provide infrastructure communications to the other, depending on the situation and the types of devices in the VAN 138 and/or PAN 121 and may provide interoperability and communication links between devices (such as video cameras and sensors) within the VAN 138 and PAN 121.

The infrastructure RAN 152 comprises a radio access network that provides for radio communication links to be arranged within the network between a plurality of user terminals. Such user terminals may be portable, mobile, or stationary and may include any one or more of the communication devices illustrated in FIG. 1, among other possibilities. At least one other terminal, e.g. used in conjunction with the communication devices, may be a fixed terminal, e.g. a base station, eNodeB, repeater, and/or access point. Such an infrastructure RAN typically includes a system infrastructure that generally includes a network of various fixed terminals, such as antennas and the like, which are in direct radio communication with the communication devices. Each of the fixed terminals operating in the RAN may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN are made via respective serving fixed terminals. Sites of neighboring fixed terminals may be offset from one another and may provide corresponding non-overlapping or partially or fully overlapping RF coverage areas.

The infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally, or alternatively, the infrastructure RAN 152 may implement a WLAN technology such as Wi-Fi, for example operating in accordance with an IEEE 802.11 standard (e.g., 802.11a, 802.11b, 802.11g) or such as a WiMAX, for example operating in accordance with an IEEE 802.16 standard.

The infrastructure RAN 152 may additionally, or alternatively, operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated as narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using OMA-PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency or frequency & time slot (in which case, in some embodiments, group IDs may be present in the group data to distinguish between groups).

In contrast, a trunked radio system and its communication devices use a pool of traffic channels for virtually an unlimited number of groups of communication devices (and which may also be referred to herein as talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (for example, at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, communication devices may dynamically affiliate with a group (and also disassociate with the group) for example based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in the infrastructure RAN 152, at the infrastructure controller 156 or at a separate cloud computing cluster (not depicted) communicably coupled to the infrastructure controller 156 via an internet protocol (IP) network (not depicted), among other possibilities.

The infrastructure RAN 152 is illustrated in FIG. 1 as providing coverage for the PAN 121 and/or the portable radio 107, the RSM video capture device 108, the laptop 116, the smart glasses 117, and/or the vehicle transceiver 137 and/or the VAN 138. In general, the infrastructure RAN 152 communicatively couples the PAN 121 and/or the portable radio 107, the RSM video capture device 108, the laptop 116, the smart glasses 117, and/or the vehicle transceiver 137 and/or the VAN 138 to a single infrastructure controller 156, which is in turn in communication with a dispatch computing device 158 which include one or more dispatch terminals operated by one or more dispatchers. The infrastructure controller 156 further couples the PAN 121 and/or the portable radio 107, the RSM video capture device 108, the laptop 116, the smart glasses 117, and/or the vehicle transceiver 137 and/or the VAN 138 to an analytical computing device 162, for example via an internet protocol (IP) network (not depicted), and the like.

For example, infrastructure RAN 152 may include one or more fixed antennas, fixed terminals, and the like (not depicted) which couple the infrastructure RAN 152 to the infrastructure controller 156 (e.g., a radio controller, call controller, PTT server, zone controller, MME, BSC, MSC, site controller, Push-to-Talk controller, or other network device) the dispatch computing device 158 and the analytical computing device 162. In other embodiments, a plurality of fixed antennas and/or terminals and additional controllers may be disposed to support a larger geographic footprint and/or a larger number of mobile devices.

It is understood by one skilled in the that as shown in FIG. 1 an IP network is present which couples the infrastructure controller 156 to the analytical computing device 162, as well as one or more database 163 described in more detail below. Such an IP network may comprise one or more routers, switches, LANs, WLANs, WANs, access points, or other network infrastructure, including but not limited to, the public Internet.

The analytical computing device 162 may comprise of a plurality of computing devices in a cloud compute cluster arrangement. The one or more computing devices comprising the analytical computing device 162 may be geographically co-located or may be separated by inches, meters, kilometers or miles, and inter-connected via electronic and/or optical interconnects.

As depicted, the system 100 may further comprise the one or more databases 163 which may be accessible via an IP network and/or the analytical computing device 162, and may include databases such as a long-term video storage database, a historical or forecasted weather database, an offender database which may include, but is not limited to, facial recognition images to match against, a cartographic database of streets and elevations, a traffic database of historical or current traffic conditions, or other types of databases. The one or more databases 163 may further include all or a portion of the databases described herein as being provided at infrastructure controller 156. In some embodiments, the one or more databases 163 may be maintained by third parties (for example, the National Weather Service or a Department of Transportation, respectively). As shown in FIG. 1, the one or more databases 163 may be communicatively coupled with the infrastructure RAN 152 (e.g. via an IP network) to allow communication devices (for example, the portable radio 107, the RSM video capture device 108, the laptop 116, and the mobile communication device 133) to communicate with and retrieve data from the one or more databases 163 via the infrastructure controller 156. In some embodiments, the one or more databases 163 are commercial cloud-based storage devices. In some embodiments, the one or more databases 163 are housed on suitable on-premises database servers. The one or more databases 163 of FIG. 1 are merely examples. In some embodiments, the system 100 additionally or alternatively includes other databases that store different information. In some embodiments, the one or more databases 163 disclosed herein and/or additional or other databases are integrated with, or internal to, the infrastructure controller 156.

As depicted, the one or more databases 163 comprise a memory which stores a device identifier 171 that identifies a mobile device, for example one of the devices worn by the user 101 and/or at the vehicle 132; in an example embodiment, the device identifier 171 may identify the portable radio 107 and may comprise one or more of an inventory number, a MAC (Media Access Control) address, and the like.

The device identifier 171 may be used, by a mobile device which it identifies, to log into a computing device and/or network of the system 100; for example, when the portable radio 107 (or another mobile device identified by the device identifier 171) transmits the device identifier 171 to, for example, one or more of the dispatch computing device 158, the infrastructure device 152 and/or the analytical computing device 162, the portable radio 107 may be logged into the one or more devices which receives the device identifier 171, and/or an associated network.

As depicted, the one or more databases 163 further stores a user identifier 172 that identifies a user; in an example embodiment, the user identifier 172 identifies the user 101 and may comprise one or more of a badge number, an employee number, a user name, and the like.

The user identifier 172 may be used, by a user which it identifies, to log into a computing device and/or network of the system 100; for example, the user identifier 172 may be received at the portable radio 107 (or another mobile device of the system 100) via a respective input device, and the portable radio 107 may transmit the user identifier 172 to, for example, one or more of the dispatch computing device 158, the infrastructure device 152 and/or the analytical computing device 162, the user may be logged into the device which receives the user identifier 172, and/or an associated network.

As depicted, the one or more databases 163 further stores: a first list 181 of channels associated with the device identifier 171; and a second list 182 of channels associated with the user identifier 172. Associations between data stored at the one or more databases 163 is depicted using dotted lines.

The term "channel" and/or "communication channel", as used herein, includes, but is not limited to, a physical radio-frequency (RF) communication channel, a logical radio-frequency communication channel, a trunking talkgroup, a non-trunking talkgroup, a trunking announcement group, a non-trunking announcement group, a VOIP communication path, a push-to-talk channel, and the like. In example embodiments, the channels will be described hereafter with respect to the term "talkgroups".

Hence, as depicted, each of the channels in each of the first list 181 and the second list 182 may comprise a respective talkgroup, and the like; for example, as depicted, the first list 181 comprises a list of a number of "N" talkgroups TG1, TG2, TG3 . . . TGN, and the second list 182 comprises a list of a number of "M" talkgroups TGu1, TGu2, TGu3 . . . TGuM. The numbers "N", "M" of each of the talkgroups may be as few as at least one talkgroup, though may be as large as tens, hundreds, or even thousands of talkgroups.

In general, the talkgroups (and/or channels) of each of the lists 181, 182 may be respectively assigned to the portable radio 107 and/or the user 101 by one or more of the dispatch computing device 158, the analytical computing device 162, the infrastructure controller 156 and/or another computing device of the system 100 (such as a Group Management Server, and the like) based on one or more of an agency and/or entity associated with the portable radio 107 and/or the user 101, a role of the user 101, and the like.

For example, the portable radio 107 may be associated with a police agency and/or entity and the talkgroups in the list 181 assigned to the portable radio 107 may include talkgroups for communicating between devices associated with the police agency, as well as talkgroups for communicating with other types of first responders and/or first responder entities and/or first responder agencies, including, but not limited to, a police entities, fire fighter entities and/or agencies, emergency medical entities and/or agencies and the like. Indeed, such inter-agency talkgroups may be used to provision the portable radio 107 to communicate with other first responder agencies during a public safety incident and the like.

Similarly, the user 101 may be associated with a police agency and/or entity and the talkgroups assigned to the user 101 may include talkgroups for communicating with other users associated with the police agency. The talkgroups in the list 182 may be based on a role and/or title and/or rank, and the like, of the user 101; for example, when the user 101 is a patrol officer, the talkgroups of the list 182 may include other patrol officers who are in the same precinct, and the like, of the patrol officer, as well as a captain in charge of a shift, and the like; however, the talkgroups of the list 182 may exclude other police officers who are higher up in an organizational hierarchy, such as the chief of police. Similarly, when the user 101 is a chief of police, the talkgroups of the list 182 may exclude patrol officers, but include police personnel who report to the chief of police.

Indeed, any suitable criteria may be used to assign the channels and/or talkgroups of each of the lists 181, 182. Further, the channels and/or talkgroups of each of the lists 181, 182, may be provisioned at the one or more databases 163 by one or more of the dispatch computing device 158, the analytical computing device 162, the infrastructure controller 156 and/or another computing device of the system 100 (such as a Group Management Server, and the like).

Furthermore, at least the list 181 may be dynamically and/or periodically updated by one or more of the dispatch computing device 158, the analytical computing device 162, the infrastructure controller 156 and/or another computing device of the system 100 (such as a Group Management Server, and the like), for example to add or remove channels and/or talkgroups from the list 181. For example, when a public safety incident occurs, a new talkgroup may be formed and assigned to the portable radio 107, and hence the list 181 may be updated to include the new talkgroup. Similarly, when the public safety incident ends, the new talkgroup may be deleted, and hence the list 181 may be updated to remove the new talkgroup.

As will be described in more detail below, one or more computing devices of the system 100 may be configured to select a subset of the first list 181 of channels, to be temporarily assigned to a mobile device when the user 101 is logged into the mobile device. However, at least one channel in the first list 181 of channels may be tagged as being an always available channel, and the subset of the first list 181 of channels (e.g. selected to be temporarily assigned to a mobile device when the user 101 is logged into the mobile device) may include the at least one channel. For example, as depicted, the talkgroup TG1 is tagged with an identifier "A" which indicates that the talkgroup TG1 is always to be included in the subset of the first list 181 of channels selected to be temporarily assigned to a mobile device when the user 101 is logged into the mobile device.

Similarly, at least one channel in the first list 181 of channels may be tagged as being a never available channel, and the subset of the first list 181 of channels (e.g. selected to be temporarily assigned to a mobile device when the user 101 is logged into the mobile device) may exclude the at least one channel. For example, as depicted, the talkgroup TG2 is tagged with an identifier "N" which indicates that the talkgroup TG2 is never to be included in the subset of the first list 181 of channels selected to be temporarily assigned to a mobile device when the user 101 is logged into the mobile device. In other words, the talkgroup TG2 is never available when a user is logged into the mobile device identified by the device identifier 171, but is available when a user is not logged into the mobile device.

As depicted, the device identifier 171 is optionally further associated with a third list 183 of a number of "P" addresses ADD1, ADD2, ADD3 . . . ADDP and which may include, but is not limited to, one or more network addresses, email addresses, phone numbers, and the like.

Similarly, the user identifier 172 is optionally further associated with a fourth list 184 of a number of "Q" addresses ADDu1, ADDu2, ADDu3 . . . ADDuQ and which may include, but is not limited to, one or more network addresses, email addresses, phone numbers, and the like. The addresses of the third list 183, may be provisioned at the one or more databases 163 by an administrator of the system 100. The addresses of the fourth list 184, may be provisioned at the one or more databases 163 by the user 101, for example when logged into a mobile device of the system 100. However, in general, addresses of the lists 183, 184 may be of two types: "enterprise addresses" (and/or enterprise contacts) which may be pushed to devices as subscriptions (e.g. user subscriptions and/or device subscriptions) by administrators and/or administrator devices; and "personal addresses" (and/or personal contacts) which may be generated by a user at a device. Furthermore, some addresses may be on both the lists 183, 184, for example when part of an enterprise subscription and also generated by a user at a device.

Similar to the channels in the first list 181, at least one address in the third list 183 may be tagged as being an always available address; for example, as depicted the address ADD2 is tagged with an identifier "A" which indicates that the address ADD2 is always to be included in the subset of the third list 183 of addresses selected to be temporarily assigned to a mobile device when the user 101 is logged into the mobile device. Further, at least one address in the third list 183 may be tagged as being a never available address; for example, as depicted the address ADD1 is tagged with an identifier "N" which indicates that the address ADD1 is always to be excluded in the subset of the third list 183 of addresses selected to be temporarily assigned to a mobile device when the user 101 is logged into the mobile device.

As depicted, the user identifier 172 is further associated with a fifth list 185 of attributes of the user 101 which, as depicted, includes two attributes "Attribute1" and "Attribute2", but which may include any suitable number of attributes. Each user attribute in the list 185 includes data that defines the respective attribute including, but not limited to, a role of the user 101, a title of the user 101, a rank of the user 101, a position of the user 101 in an organizational hierarchy, an entity associated with the user 101, an agency associated with the user 101, a last mobile device used by the user, a location of the user (when available) and the like. The agency and/or entity associated with the user 101 may include a first responder agency and/or entity and/or another type of agency and/or entity. The role of the user 101 may include the title and/or rank and/or the position in an organizational hierarchy and/or the role may be a role within a group of users within the agency (e.g. a team leader and the like), and/or the role may be a logical role associated with the agency that may in turn be associated with attributes (e.g. data indicative a team leader and/or inter-agency representative, which may be different from a title and/or rank and/or a position within an organizational hierarchy).

As depicted, the device identifier 171 is further associated with a sixth list 186 of attributes of the mobile device identified by the device identifier 171 which, as depicted, includes two attributes "AttributeD1" and "AttributeD2", but which may include any suitable number of attributes. Each device attribute in the list 186 includes data that defines the respective attribute including, but not limited to, an encryption capability of the mobile device, an Multimedia Broadcast Multicast Services (MBMS) capability of the mobile device, an Evolved Multimedia Broadcast Multicast Services (eMBMS) capability of the mobile device, accessories mated with the mobile device (e.g. smart glasses, video cameras, body worn cameras, and the like), a location of the mobile device (when available), whether the mobile device is a last device used by the user associated with the user identifier, and the like.

Although FIG. 1 describes a communication system 100 generally as a public safety communication system that includes a user 101 generally described as a police officer and a vehicle 132 generally described as a police car or cruiser, in other embodiments, the communication system 100 may additionally or alternatively be a retail communication system including a user that may be an employee of a retailer and a vehicle 132 that may be a vehicle for use by the user 101 in furtherance of the employee's retail duties (e.g., a shuttle or self-balancing scooter). In other embodiments, the communication system 100 may additionally or alternatively be a warehouse communication system including a user 101 that may be an employee of a warehouse and a vehicle 132 that may be a vehicle for use by the user 101 in furtherance of the employee's retail duties (e.g., a forklift). In still further embodiments, the communication system 100 may additionally or alternatively be a private security communication system including a user 101 that may be an employee of a private security company and a vehicle 132 that may be a vehicle for use by the user 101 in furtherance of the private security employee's duties (e.g., a private security vehicle or motorcycle). In even further embodiments, the communication system 100 may additionally or alternatively be a medical communication system including a user 101 that may be a doctor or nurse of a hospital and a vehicle 132 that may be a vehicle for use by the user 101 in furtherance of the doctor or nurse's duties (e.g., a medical gurney or ambulance). In still another example embodiment, the communication system 100 may additionally or alternatively be a heavy machinery communication system including a user 101 that may be a miner, driller, or extractor at a mine, oil field, or precious metal or gem field and a vehicle 132 that may be a vehicle for use by the user 101 in furtherance of the miner, driller, or extractor's duties (e.g., an excavator, bulldozer, crane, front loader). As one other example, the communication system 100 may additionally or alternatively be a transportation logistics communication system including a user 101 that may be a bus driver or semi-truck driver at a school or transportation company and a vehicle 132 that may be a vehicle for use by the user 101 in furtherance of the driver's duties. However, it is understood by a person skilled in the art, that these are just examples and any other appropriate scenario is within the scope of the specification.

In the examples of the user 101 being other than a police officer, certain sensors such as the weapon status sensor described above with respect to the police officer user may be replaced or supplemented with other types of sensors, such as one or more sensors that may detect whether a particular retail, warehouse, private security, heavy machinery operator, transportation driver, or other type of user has equipment necessary to perform a particular assigned or to-be-assigned task, whether such equipment is in a workable or sufficient condition, or whether the equipment is sufficient for the area or environment the user is in. Other possibilities and other variations exist as well.

Figure 2:
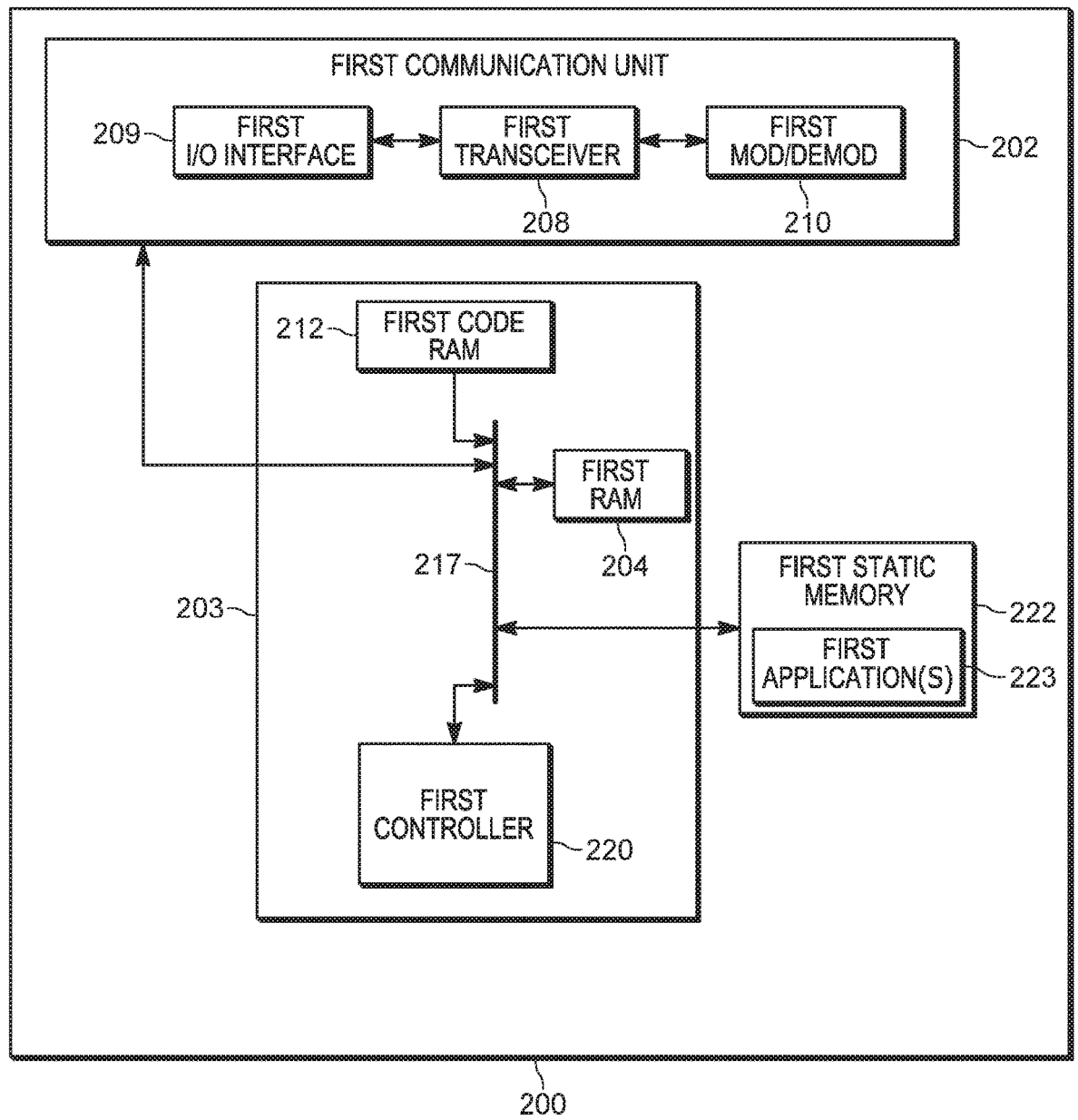
FIG. 2 is a device diagram showing a device structure of a computing device for managing channel and/or talkgroup assignments in accordance with some embodiments.

Attention is next directed to FIG. 2 which depicts which sets forth a schematic diagram of a first example device 200 that may include, but is not limited to, one or more of the analytical computing device 162, the infrastructure controller 156, the dispatch computing device 158, and the like. For example, the configuration of the analytical computing device 162 may generally be similar to the configuration of the example device 200. Furthermore, the functionality of the device 200 may be distributed among a plurality of computing devices of the system 100 such as two or more of the analytical computing device 162, the infrastructure controller 156, the dispatch computing device 158, and the like.

Hence, as depicted in FIG. 2, the device 200 generally includes a first communications unit 202, a first processing unit 203, a first Random-Access Memory (RAM) 204, one or more first wireless transceivers 208, one or more first wired and/or wireless input/output (I/O) interfaces 209, a first combined modulator/demodulator 210, a first code Read Only Memory (ROM) 212, a first common data and first address bus 217, a first controller 220, and a first static memory 222 storing one or more first applications 223 for managing channel and/or talkgroup assignments. The device 200 is described hereafter in further detail.

As shown in FIG. 2, the device 200 includes the communications unit 202 coupled to the common data and address bus 217 of the processing unit 203. While not depicted, the device 200 may also include one or more input devices (e.g., keypad, pointing device, touch-sensitive surface, etc.) and a display screen (which, in some embodiments, may be a touch screen and thus also act as an input device), each coupled to be in communication with the processing unit 203. The device 200 may also include one or more of speaker and a microphone used for interactions with the device 200.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory (RAM) 204 and a static memory 222.

The communications unit 202 may include one or more wired and/or wireless input/output (I/O) interfaces 209 that are configurable to communicate with other communication devices.

For example, the communications unit 202 may include one or more wireless transceivers 208, such as a DMR transceiver, a P25 transceiver, a Bluetooth transceiver, a Wi-Fi transceiver, for example operating in accordance with an IEEE 802.11 standard (e.g., 802.11a, 802.11b, 802.11g), an LTE transceiver, a WiMAX transceiver, for example operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components (e.g. a display screen, an input device, a speaker and/or a microphone, and the like).

The controller 220 includes one or more logic circuits, one or more processors, one or more microprocessors, one or more ASIC (application-specific integrated circuits) and one or more FPGA (field-programmable gate arrays), and/or another electronic device. In some embodiments, the controller 220 and/or the device 200 is not a generic controller and/or a generic device, but a device specifically configured to implement functionality for managing channel and/or talkgroup assignments. For example, in some embodiments, the device 200 and/or the controller 220 specifically comprises a computer executable engine configured to implement functionality for managing channel and/or talkgroup assignments.

The static memory 222 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 2, programming instructions (e.g., machine readable instructions) that implement the functional teachings of the device 200 as described herein are maintained, persistently, at the memory 222 and used by the controller 220 which makes appropriate utilization of volatile storage during the execution of such programming instructions.

In particular, the memory 222 stores instructions corresponding to the one or more applications 223 (shown as first application(s) 223 in FIG. 2) that, when executed by the controller 220, enables the controller 220 to implement functionality for managing access authorizations of devices. In illustrated examples, when the controller 220 executes the one or more applications 223, the controller 220 is enabled to: receive, via the communications unit 202, from a mobile device (e.g. identified by the device identifier 171), the user identifier 172 indicating a log-in to the mobile device by the user 101; select a subset of the first list 181 of channels, to be temporarily assigned to the mobile device when the user 101 is logged into the mobile device, based on the one or more attributes (e.g. of the list 185) of the user 101; and transmit, via the communications unit 202, to the mobile device, a combined list that includes the subset of the first list 181 of channels, and the second list 182 of channels, to enable the mobile device to communicate using channels in the combined list.

In some embodiments, when the controller 220 executes the one or more applications 223, the controller 220 is further enabled to: select a further subset of the third list 183 of addresses, to be temporarily assigned to the mobile device when the user 101 is logged into the mobile device, based on the one or more attributes of the user; and transmit, via the communications unit 202, to the mobile device, a further combined list that includes the further subset of the third list 183 of addresses, and the fourth list 184 of addresses, to enable the mobile device to access the further combined list.

Hence, the one or more applications 223 may alternatively be referred to as channel and/or talkgroup assignment applications as the one or more applications 223 may be used to manage channel and/or talkgroup assignments for devices. Indeed, different applications, of the one or more applications 223, may be used depending on a mode of channel and/or talkgroup assignment. For example, one of the one or more applications 223 may be used to manage channel and/or talkgroup assignments based on roles and/or titles and the like of a user, while others of the one or more applications 223 may be used to manage channel and/or talkgroup assignments based on agencies associated with a user. Hereafter, the one or more applications 223 will be interchangeably referred to as the application 223.

Figure 3:
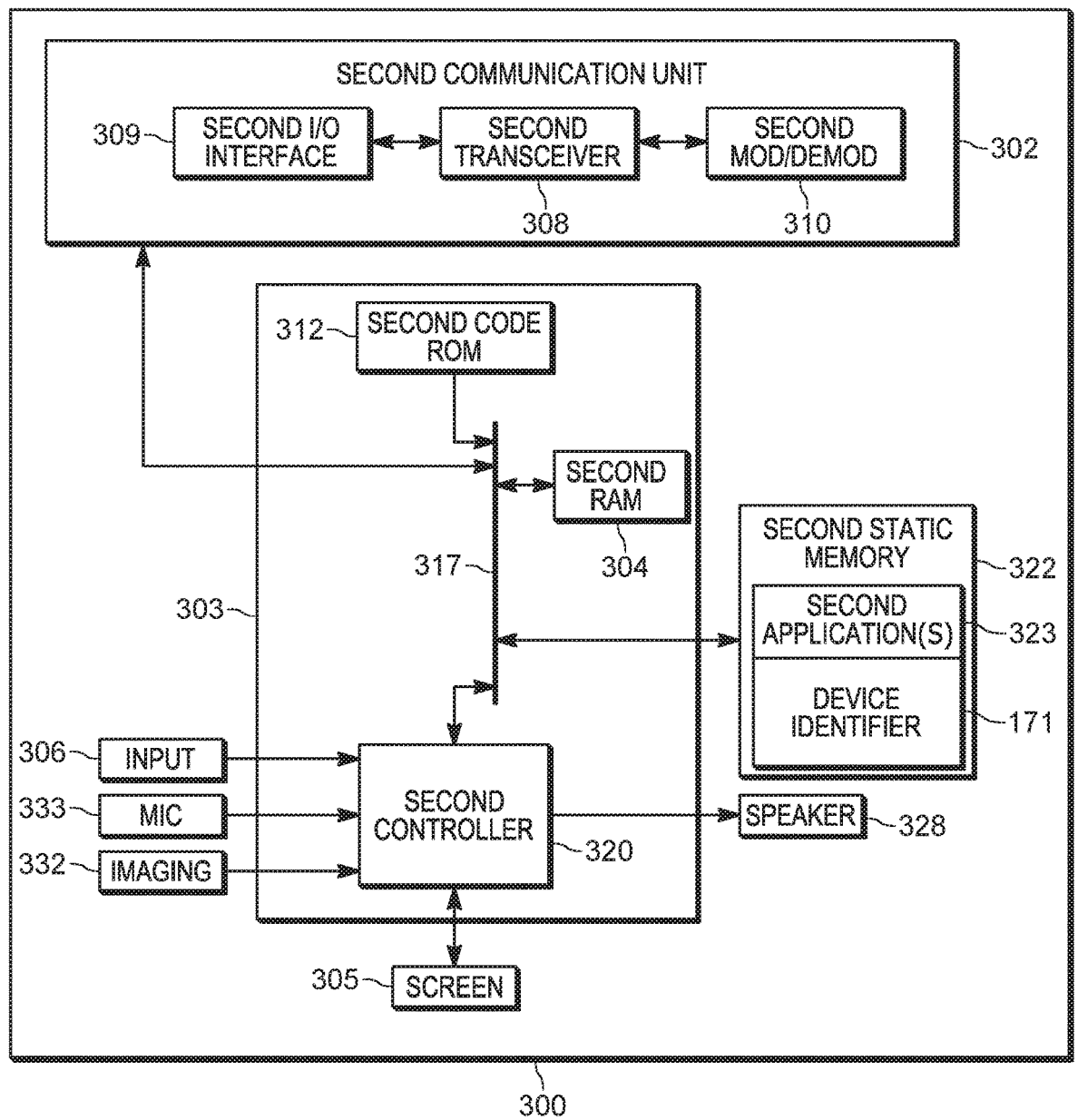
FIG. 3 is a device diagram showing a device structure of a device for which channel and/or talkgroup assignments may be managed in accordance with some embodiments.

Attention is next directed to FIG. 3 which sets forth a schematic diagram that illustrates an example second device 300. One or more of the one or more of the devices assigned to the user 101, such as the portable radio 107 and/or the mobile communication device 133 of the vehicle 132, may have a configuration similar to the mobile device 300. Hence, the mobile device 300 may alternatively be referred to as the mobile device 300. Indeed, the device identifier 171 stored at the one or more databases 163 may alternatively identify the mobile device 300 and the list 181 of channels may be assigned to the mobile device 300 as described above; hence, in example embodiments described hereafter, the mobile device 300 is described as storing the device identifier 171 to enable the mobile device 300 to log into a computing device and/or network of the system 100.

As depicted in FIG. 3, the example device 300 generally includes a second communications unit 302, a second processing unit 303, a second Random-Access Memory (RAM) 304, a display screen 305, an input device 306, one or more second wireless transceivers 308, one or more second wired and/or wireless input/output (I/O) interfaces 309, a second combined modulator/demodulator 310, a second code Read Only Memory (ROM) 312, a second common data and address bus 317, a second controller 320, a second static memory 322 storing one or more second applications 323, a speaker 328, an imaging device 332 and a microphone 333. As depicted, the memory 322 further stores the device identifier 171 which, when transmitted to the device 200, and the like, enables the mobile device 300 to log into a computing device and/or network of the system 100.

However, while the mobile device 300 is described with respect to including certain components, it is understood that the mobile device 300 may be configured according to the functionality of a specific device. For example, one or more of the imaging device 332, the microphone 333 and/or other media components associated with the mobile device 300 may be external to the mobile device 300 and communicatively coupled thereto.

As another example, in some embodiments, the mobile device 300 may further include a location determination device (for example, a global positioning system (GPS) receiver) and the like. Other combinations are possible as well.

Furthermore, the mobile device 300 may be communicatively coupled to other devices for example in the personal area network 121 and/or the vehicle area network 138 of FIG. 1.

The example device 300 is described hereafter in further detail. As shown in FIG. 3, the mobile device 300 includes the communications unit 302 coupled to the common data and address bus 317 of the processing unit 303. The device 300 may also include one or more input devices 306 (e.g., keypad, pointing device, touch-sensitive surface, etc.) and the display screen 305 (which, in some embodiments, may be a touch screen and thus also act as an input device 306), each coupled to be in communication with the processing unit 303.

The speaker 328 may be present for reproducing audio that is decoded from voice or audio streams of calls received via the communications unit 302 from other portable radios, from other ad-hoc or direct mode devices, and/or from an infrastructure RAN device, and the like. The microphone 333 may be present for capturing audio from a user that is further processed by the processing unit 303 and/or is transmitted as voice or audio data by the communications unit 302 to other portable radios and/or other communication devices. Hence, the combination of the speaker 328 and the microphone 333 may be used to communicate via channels and/or talkgroups. However, such communication may also occur via speakers and/or microphones of other devices in the PAN 121 and/or the VAN 138.

The imaging device 332 may provide video (still or moving images) of an area in a field of view of the mobile device 300 for further processing by the processing unit 303 and/or for further transmission by the communications unit 302 and which may also be used in communications via channels and/or talkgroups.

The processing unit 303 may include the code Read Only Memory (ROM) 312 coupled to the common data and address bus 317 for storing data for initializing system components. The processing unit 303 may further include the controller 320 coupled, by the common data and address bus 317, to the Random-Access Memory (RAM) 304 and a static memory 322.

The communications unit 302 may include one or more wired and/or wireless input/output (I/O) interfaces 309 that are configurable to communicate with other communication devices, the infrastructure controller 156, the dispatch computing device 158 and/or the analytical computing device 162.

For example, the communications unit 302 may include one or more wireless transceivers 308, such as a digital mobile radio (DMR) transceiver, a Project 25 (P25) transceiver, a Bluetooth transceiver, a Wi-Fi transceiver, for example operating in accordance with an IEEE 802.11 standard (e.g., 802.11a, 802.11b, 802.11g), an LTE transceiver, a WiMAX transceiver, for example operating in accordance with an IEEE 802.16 standard, and/or another similar type of wireless transceiver configurable to communicate via a wireless radio network.

The communications unit 302 may additionally or alternatively include one or more wireline transceivers 308, such as an Ethernet transceiver, a USB transceiver, or similar transceiver configurable to communicate via a twisted pair wire, a coaxial cable, a fiber-optic link, or a similar physical connection to a wireline network. The transceiver 308 is also coupled to a combined modulator/demodulator 310.

The controller 320 may include ports (e.g. hardware ports) for coupling to the display screen 305, the input device 306, the imaging device 332, the speaker 328 and/or the microphone 333.

The controller 320 includes one or more logic circuits, one or more processors, one or more microprocessors, one or more ASIC (application-specific integrated circuits) and one or more FPGA (field-programmable gate arrays), and/or another electronic device. In some embodiments, the controller 320 and/or the mobile device 300 is not a generic controller and/or a generic device, but a device specifically configured to implement functionality for communicating via channels and/or talkgroups assigned to the mobile device 300. For example, in some embodiments, the mobile device 300 and/or the controller 320 specifically comprises a computer executable engine configured to implement functionality for communicating via channels and/or talkgroups assigned to the mobile device 300.

The static memory 322 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 3, programming instructions (e.g., machine readable instructions) that implement the functional teachings of the mobile device 300 as described herein are maintained, persistently, at the memory 322 and used by the controller 320 which makes appropriate utilization of volatile storage during the execution of such programming instructions.

In particular, the memory 322 stores instructions corresponding to the one or more applications 323 that, when executed by the controller 320, enables the controller 320 to implement functionality for communicating via channels and/or talkgroups assigned to the mobile device 300. In illustrated examples, when the controller 320 executes the one or more applications 323, the controller 320 is enabled to: receive a combined list that includes the subset of the first list 181 of channels (e.g. selected based on the one or more user attributes in the fifth list 185), and the second list 182 of channels, to enable the mobile device 300 to communicate using channels in the combined list. In further embodiments, when the controller 320 executes the one or more applications 323, the controller 320 is further enabled to: receive a further combined list that includes the subset of the third list 183 of addresses (e.g. selected based on the one or more user attributes in the fifth list 185), and the fourth list 184 of addresses, to enable the mobile device 300 to communicate using addresses in the further combined list.

The one or more applications 323 may hence be alternatively referred to as a dynamic channel and/or talkgroup assignment application. Indeed, different applications, of the one or more applications 323, may be used depending on a mode of dynamic channel and/or talkgroup assignment. Hereafter, the one or more applications 323 will be interchangeably referred to as the application 323.

Figure 4:
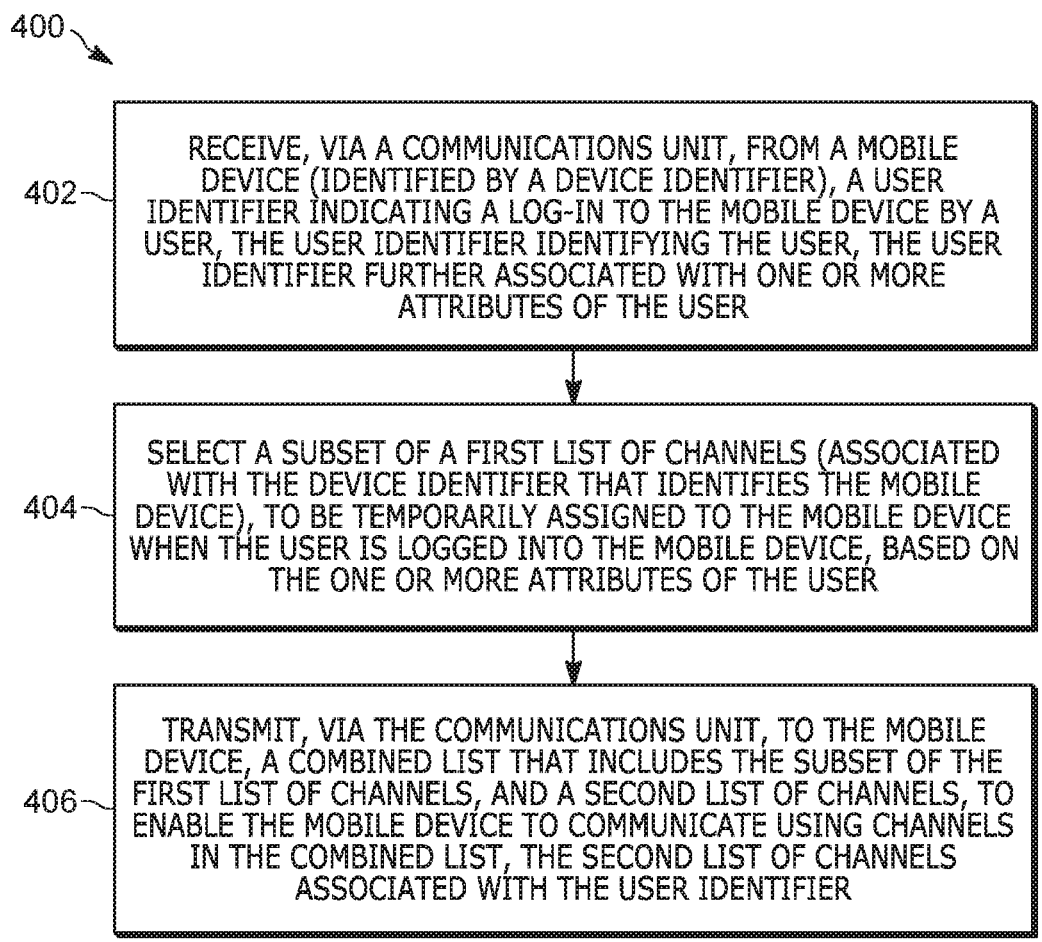
FIG. 4 is a flowchart of a method for managing channel and/or talkgroup assignments in accordance with some embodiments.

Attention is now directed to FIG. 4 which depicts a flowchart representative of a method 400 for managing channel and/or talkgroup assignments. The operations of the method 400 of FIG. 4 correspond to machine readable instructions that are executed by, for example, the device 200, and specifically by the controller 220 of the device 200. In the illustrated example, the instructions represented by the blocks of FIG. 4 are stored at the memory 222 for example, as the application 223. The method 400 of FIG. 4 is one way in which the controller 220 and/or the device 200 and/or the system 100 is configured. Furthermore, the following discussion of the method 400 of FIG. 4 will lead to a further understanding of the system 100, and its various components. However, it is to be understood that the method 400 and/or the system 100 may be varied, and need not work exactly as discussed herein in conjunction with each other, and that such variations are within the scope of present embodiments.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 4 may be implemented on variations of the system 100 of FIG. 1, as well.

The method 400 is further described with respect to the user 101 logging into the mobile device 300, which may include, but is not limited to, the user 101 logging into the portable radio 107. However, the user 101 may be logging into any mobile device of the system 100.

At a block 402, the controller 220 receives, via the communications unit 202, from the mobile device 300 (e.g. identified by the device identifier 171), the user identifier 172 indicating a log-in to the mobile device 300 by the user 101. The user identifier 172 may be received as part of a general log-in to one or more computing devices and/or networks of the system 100 by the user 101. Furthermore, the mobile device 300 may have previously logged into one or more computing devices and/or networks of the system 100, independent of the user 101, for example when the mobile device 300 was turned on. In these embodiments, the list 181 of channels may have been previously provided to the mobile device 300 to enable the mobile device 300 to communicate on the channels of the list 181.

At a block 404, the controller 220 selects a subset of the first list 181 of channels, to be temporarily assigned to the mobile device 300 when the user 101 is logged into the mobile device 300, based on the one or more attributes (e.g. of the list 185) of the user 101. The first list 181 of channels is associated with the device identifier 171 that identifies the mobile device 300.

For example, one or more user attributes of the 101 may be a role and/or title and/or position of the user 101, and one or more of the channels in the list 181 may be for intra-agency communication between first responders of given roles and/or titles and/or ranks, for example police officers, of given ranks within an agency. In an example embodiment, one of the channels of the list 181 may be for communication between captains of a police agency, and the like. Hence, in these embodiments, the subset of the list 181 may include the one or more of the channels in the list 181 for intra-agency communication of responders having a similar role and/or title and/or rank and/or position of the user 101, as well as any channels that are tagged as being an always available channel (e.g. the talkgroup TG1). Channels tagged as never available are excluded from the subset of the list 181.

In another example, one or more attributes of the user 101 may be an agency and/or entity associated of the user 101, and one or more of the channels in the list 181 may be for inter-agency communication between specific agencies for example between a police agency and a firefighting agency. Hence, in these embodiments, the subset of the list 181 may include the one or more of the channels in the list 181 for inter-agency communication that includes the agency of the user 101, as well as any channels that are tagged as being an always available channel (e.g. the talkgroup TG1). Channels tagged as never available are excluded from the subset of the list 181.

In another example, two or more attributes of the user 101 may be a role and/or title and/or position of the user 101 and an agency of the user, and one or more of the channels in the list 181 may be for inter-agency communication between first responders of given roles and/or titles and/or ranks in two or more agencies, for example police officers, fire fighters and emergency medical technicians of given ranks within their respective given agencies. In an example embodiment, one of the channels of the list 181 may be for communication between chiefs of police, fire chiefs, and an emergency medical technician manager, and the like. In another example embodiment, one of the channels of the list 181 may be for communication between patrol police officers, fire firefighters and paramedics, and the like. Hence, in these embodiments, the subset of the list 181 may include the one or more of the channels in the list 181 for inter-agency communication of responders having a similar role and/or title and/or rank and/or position of the user 101 and that includes the agency of the user 101, as well as any channels that are tagged as being an always available channel (e.g. the talkgroup TG1). Channels tagged as never available are excluded from the subset of the list 181.

At a block 406, the controller 220 transmits, via the communications unit 202, to the mobile device 300, a combined list that includes the subset of the first list 181 of channels, and the second list 182 of channels, to enable the mobile device 300 to communicate using channels in the combined list. Hence, when the mobile device 300 receives the subset of the first list 181 of channels, and the second list 182 of channels, for example in a common address book, a configuration of the mobile device 300 changes such that the mobile device 300 thereafter is enabled to communicate using channels in the combined list.

Figure 5:
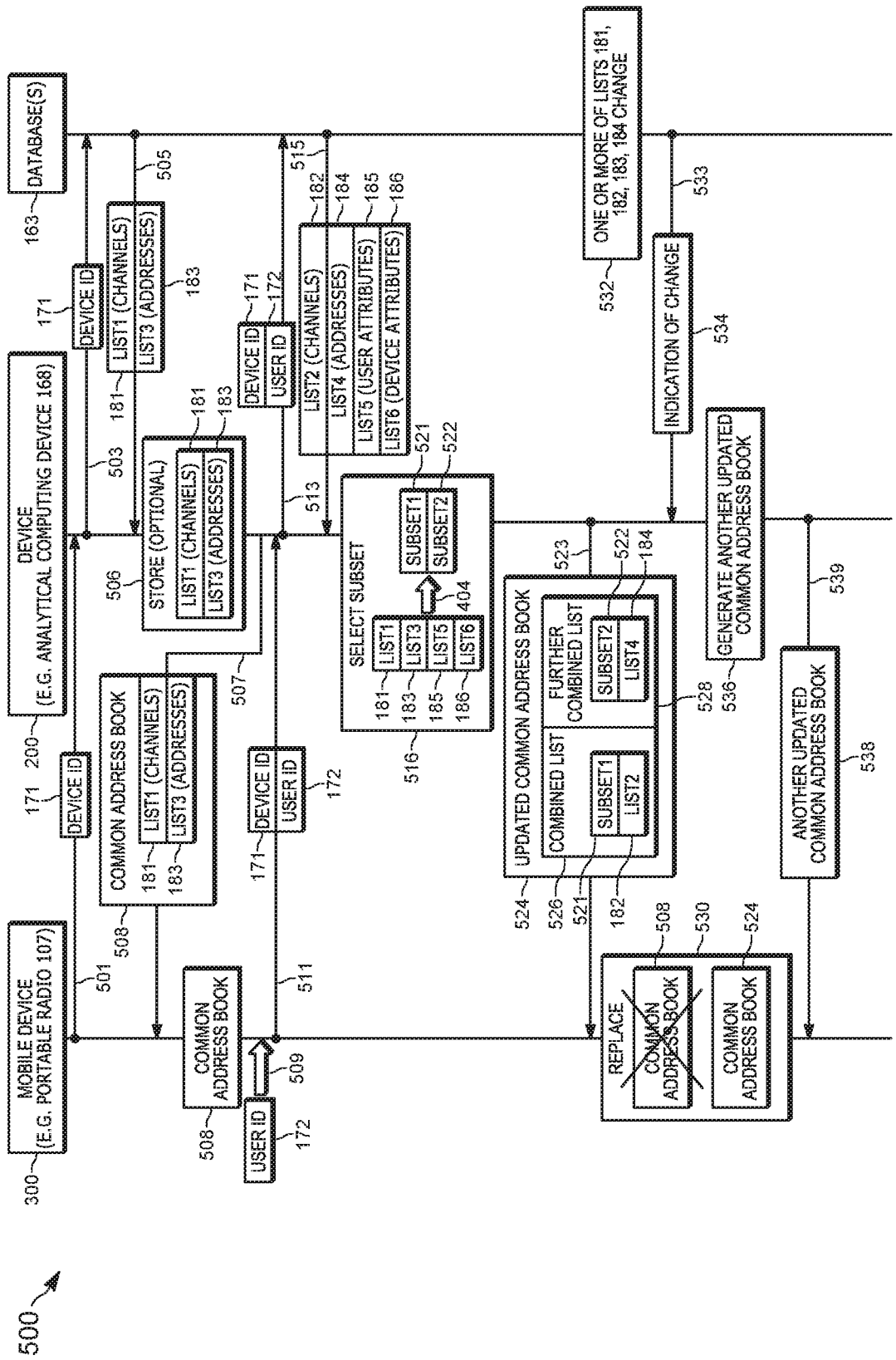
FIG. 5 is a signal diagram showing communication between components of the system of FIG. 1 when implementing the method for managing channel and/or talkgroup assignments in accordance with some embodiments.
Figure 6:
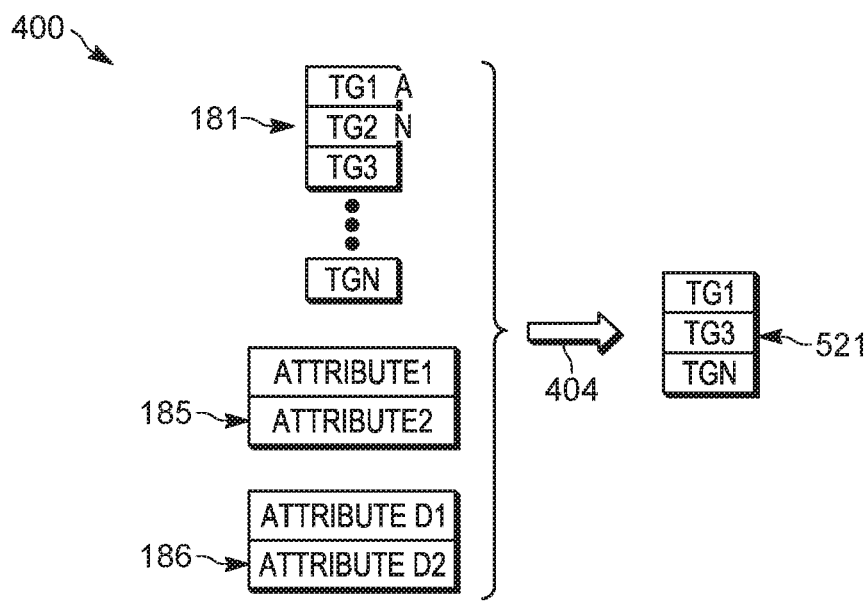
FIG. 6 is an example of selecting a subset of a list of channels and/or talkgroups, associated with a device identifier of a mobile device, to be temporarily assigned to the mobile device when a user is logged into the mobile device, the subset selected based on the one or more attributes of the user in accordance with some embodiments.

Example embodiments of the method 400 is next described with respect to FIG. 5 to FIG. 6.

Attention is next directed to FIG. 5 which depicts a signal diagram 500 showing communication between the devices 200, 300 and the one or more databases 163 while the mobile device 300 is implementing the method 400. In the depicted example embodiment, the device 200 may comprise the analytical computing device 162 and the mobile device 300 may comprise the portable radio 107.

When the mobile device 300 is turned on, and/or the link 144 is established between the mobile device 300 and the infrastructure controller 156, the mobile device 300 transmits 501 the device identifier 171 to the device 200; the device 200 receives the device identifier 171 and queries 503 the one or more databases 163 using the device identifier 171 for channels and/or addresses associated with the device identifier 171. The one or more databases 163 returns 505 the first list 181 of channels and (optionally) the third list 183 of addresses to the device 200 which may optionally store 506 the lists 181, 183. The device 200 transmits 507 the lists 181, 183 to the mobile device 300, for example in a common address book 508, which stores the common address book 508 (e.g. at the memory 222). Thereafter, the mobile device 300 may communicate on channels and/or talkgroups of the list 181, and further the addresses in the list 183 are available to the mobile device 300 such that messages, emails and/or phone calls, and the like, may be initiated using the addresses in the list 183. Indeed, some channels and/or talkgroups may further support different types of communications and/or multimedia communications, and the like, such as push-to-talk communications, video communications, messaging communications, presence/location communications and, when such channels and/or talkgroups of the list 181 support such different types of communications and/or multimedia communications, such communications may be initiated using the addresses in the list 183.

Heretofore, the user 101 has not logged into the mobile device 300, hence, the user 101 may use the mobile device 300 to communicate on channels and/or talkgroups of the list 181, and/or using the addresses in the list 183. Rather, heretofore the device 200 has: prior to receiving the user identifier 172 indicating a log-in to the mobile device 300 by the user 101: received, via the communications unit 202, from the mobile device 300, the device identifier 171 indicating a user-independent log-in by the mobile device 300; and transmitted, via the communications unit 202, to the mobile device 300, the first list 181 of channels, to enable the mobile device 300 to communicate using channels in the first list 181 of channels. The device 300 has further: transmitted, via the communications unit 202, to the mobile device 300, the third list 183 of addresses, to enable the mobile device 300 to communicate using channels in the third list 183 of addresses.

However, the user 101 may thereafter log into the mobile device 300. Alternatively, the user 101 may log into the mobile device 300 when it turns on and/or prior to the mobile device 300 transmitting 501 the device identifier 171 to the device 200.

Either way, the mobile device 300 may receive 509 the user identifier 172, for example using the input device(s) 306, and transmit 511 the user identifier 172 to the device 200 as part of a general log-in process, for example in conjunction with the device identifier 171 to indicate that the user 101 having the user identifier 172 is logging into the mobile device identified by the device identifier 171.

The device 200 receives the user identifier 172 (e.g. at the block 402 of the method 400) and the device identifier 171, and transmits 513 the user identifier 172 and the device identifier 171 to the one or more databases 163; the one or more databases 163 may store an association therebetween to indicate that the user 101 has presently logged into the mobile device 300.

The one or more databases 163 returns 515, to the device 200, the second list 182 of channels and optionally (as depicted) the fourth list 184 of addresses associated with the user identifier 172, along with the fifth list 185 of attributes associated with the user identifier 172, and optionally the sixth list 186 of attributes associated with the device identifier 171. In embodiments where the device 200 has not previously stored the lists 181, 183, the one or more databases 163 may again return the lists 181, 183; alternatively, the one or more databases 163 may return the lists 181, 183 regardless of whether the device 200 has stored the lists 181, 183.

The device 200 receives the lists 182, 185, and optionally the lists 181, 183, 184, 186, and selects 516 the subset of the first list 181 based on the attributes of the user 101 from the list 185 (e.g. at the block 404 of the method 400).

For example, as described above, a subset 521 of the first list 181 may comprise channels associated with a same agency as the user 101, as indicated by the user attributes in the fifth list 185; and/or the subset 521 of the first list 181 may comprise channels associated with a role and/or rank and/or position of the user 101, as indicated by the user attributes in the fifth list 185.

Furthermore, channels of the first list 181 which are tagged as always available channels (such as the talkgroup TG1) are included in the subset 521, while channels of the first list 181 which are tagged as never available channels (such as the talkgroup TG2) are excluded from the subset 521.

Optionally, the subset 521 of the first list 181 may comprise channels selected based also on the attributes of the mobile device 300 as stored in the sixth list 186. A person of skill in the art understands that, in these embodiments, the subset 521 of the first list 181 may be filtered based on the attributes of the device 200 as stored in the sixth list 186.

For example, one or more of the channels initially selected for the subset 521 may be secure channels; when the attributes of the mobile device 300 of the sixth list 186 indicate that the mobile device 300 does not include encryption capabilities, such channels may be excluded from the subset 521. Similarly, one or more of the channels initially selected for the subset 521 may be group channels; when the attributes of the mobile device 300 of the sixth list 186 indicate that the mobile device 300 does not include group chat capabilities and/or is not MBMS and/or eMBMS capable, such channels may be excluded from the subset 521. Similarly, one or more of the channels initially selected for the subset 521 may be video channels; when the attributes of the mobile device 300 of the sixth list 186 indicate that the mobile device 300 does not include video capabilities and/or an accessory of the mobile device 300 does not include video capabilities, such channels may be excluded from the subset 521. Similarly, one or more of the channels initially selected for the subset 521 may be channels to be used when a presence and/or operational status of the mobile device 300 is in a given state, such as an emergency state (e.g. enabled to participate in emergency communications); when the attributes of the mobile device 300 of the sixth list 186 indicate that the mobile device 300 is not in an emergency state (e.g. not enabled to participate in emergency communications), such channels may be excluded from the subset 521. Similarly, one or more of the channels initially selected for the subset 521 may be channels to be used when the mobile device 300 is in a given location and/or within a given geofence; when the attributes of the mobile device 300 of the sixth list 186 indicate that the mobile device 300 is not in the given location and/or within the given geofence, such channels may be excluded from the subset 521.

Similarly, the device 200 may optionally select a subset 522 of the third list 183 of addresses based on the user attributes of the fifth list 185 and optionally the device attributes of the sixth list 186. In addition, addresses of the third list 183 which are tagged as always available addresses (such as the address ADD2) are included in the subset 522, while addresses of the third list 183 which are tagged as never available addresses (such as the address ADD1) are excluded from the subset 522.

The device 200 transmits 523 an updated common address book 524 to the mobile device 300 (e.g. at the block 406 of the method 400) including: a combined list 526 of the subset 521 of the first list of channels, and the second list 182 of channels; and optionally a further combined list 528 of the subset 522 of the third list 183 of addresses, and the fourth list 184 of addresses. Receipt of the updated common address book 524 causes the mobile device 300 to replace 530 the common address book 508 previously received with the updated common address book 524 to enable the mobile device 300 to communicate using channels in the combined list 526, and optionally using the addresses in the further combined list 528. Hence, after receiving the user identifier 172 indicating a log-in to the mobile device 300 by the user 101, the device 200: transmits, via the communications unit 202, to the mobile device 300, the updated combined list 526, which causes the combined list 526 to replace the first list 181 of channels at the mobile device 300, and further causes the further combined list 528 of addresses to replace the third list 183 of addresses at the mobile device 300. Receipt of the updated common address book at the mobile device 300 causes a change in configuration of the mobile device 300 such that the mobile device 300 thereafter is enabled to communicate using channels in the combined list 526.

In these embodiments the combined lists 526, 528 are provided in a common address book; however, in other embodiments, the combined lists 526, 528 may be provided in other formats.

In addition, while example embodiments of FIG. 5 are described with respect to generating both the subset 521 of channels of the first list 181 and the subset 522 of addresses of the third list 183, in other embodiments, only the subset 521 of the channels may be generated, while in other embodiments, only the subset 522 of the addresses may be generated.

In addition, the second list 182 of channels may also be filtered based on the device attributes in the sixth list 186. Persons of skill in the art understand that, in these example embodiments, the controller 220 of the device 200 may be configured to filter the combined list 521 of channels based on one or more of: a capability of the mobile device 300; accessories of the mobile device 300; an operational status of the mobile device 300; a location of the mobile device 300; a number of participants in a respective channel of the combined list 526; whether the mobile device 300 is a last device used by the user associated with the user identifier 172, and the like.

In some embodiments, one or more of the lists 181, 182, 183, 184 as stored at the one or more databases 163 may change 532; for example, channels and/or talkgroups may be added and/or deleted from the lists 181, 183 and/or addresses may be added and/or deleted from the lists 182, 184. Such changes may occur via the dispatch computing device 158, and/or other devices of the system 100, interacting with the one or more databases 163 to makes such changes. In these embodiments, the one or more databases 163 may transmit 533 an indication 534 of the changes to the mobile device 300 which generates 536 another updated common address book 538 similar to how the updated common address book 524 was generated. Such generation may include generating an updated subset of the first list 181 of channels based on the changes and the one or more user attributes stored in the fifth list 185. The indication 534 may include similar data that was returned to the mobile device 300 at the return 515, updated, however to include the changes to the lists 181, 182, 183, 184.

The device 200 transmits 539 the another updated common address book 538 to the mobile device 300 which again may replace the common address book 524 with the another updated common address book 538, to again change the configuration of the mobile device 300. In particular, when the list 181 of channels changes, the transmission 539 includes the device 200 transmitting, via the communications unit 202, to the mobile device 300, at least the updated subset of the first list 181 of channels.

Attention is next directed to FIG. 6 which depicts an example embodiment of the block 406 of the method 400 and/or the selection 516 of the signal diagram 500. In particular, in FIG. 6, the subset 521 of the first list 181 is selected based on the user attributes of the fifth list 185, and optionally the device attributes of the sixth list 186. Persons of skill in the art will understand, for example, that the talkgroups TG3, TGN are associated with one or more of a role and/or an agency of the user 101 as defined in the user attributes of the fifth list 185, hence the talkgroups TG3, TGN are included in the subset 521. Persons of skill in the art will further understand, for example, that the talkgroups TG3, TGN are compatible with the device attributes of the sixth list 186.

The talkgroup TG1 may or may not be associated with one or more of a role and/or an agency of the user 101 as defined in the user attributes of the fifth list 185, and/or the talkgroup TG1 may or may not be compatible with the device attributes of the sixth list 186. However, the talkgroup TG1 is nonetheless included in the subset 521 as the talkgroup is tagged as being an always available channel.

Similarly, the talkgroup TG2 may or may not be associated with one or more of a role and/or an agency of the user 101 as defined in the user attributes of the fifth list 185, and/or the talkgroup TG2 may or may not be compatible with the device attributes of the sixth list 186. However, the talkgroup TG2 is nonetheless excluded in the subset 521 as the talkgroup is tagged as being a never available channel.

While not depicted, the second subset 522 of the third list 183 may be selected in a similar manner.

Heretofore, it has been assumed that the user 101 has logged into one mobile device, and that assignment of channels and/or talkgroups has been based on attributes of the user 101 and optionally attributes of the mobile device which the user 101 logs into.

However, in some example embodiments, the user 101 may be logged into a plurality of mobile devices, and assignment of channels and/or talkgroups may include assigning channels and/or talkgroups to one or more of the plurality of mobile devices based respective attributes of one or more the user 101 and/or the plurality of mobile devices. For example, the user 101 may be logged into the portable radio 107, the laptop 116 and the mobile communication device 133 of the vehicle 132; when all such mobile devices that the user 101 is logged into are configured to communicate using channels and/or talkgroups, and the system 100 is assigning channels and/or talkgroups associated with the user 101 to such mobile devices, the system 100 may assign such channels and/or talkgroups based on the attributes of one or more the user 101 and/or the plurality of mobile devices.

Such assignment is different from affiliation of a talkgroup with a device; indeed, affiliation of a channel and/or talkgroup with a mobile device may occur only after the channel and/or talkgroup has been previously assigned to the mobile device. For example, affiliation of a talkgroup with a mobile device may occur when a call is initiated on a talkgroup that has been previously assigned to the mobile device. When affiliation of a talkgroup occurs with a mobile device that does not have capabilities to support the call on the talkgroup, processing resources may be wasted.

Figure 7:
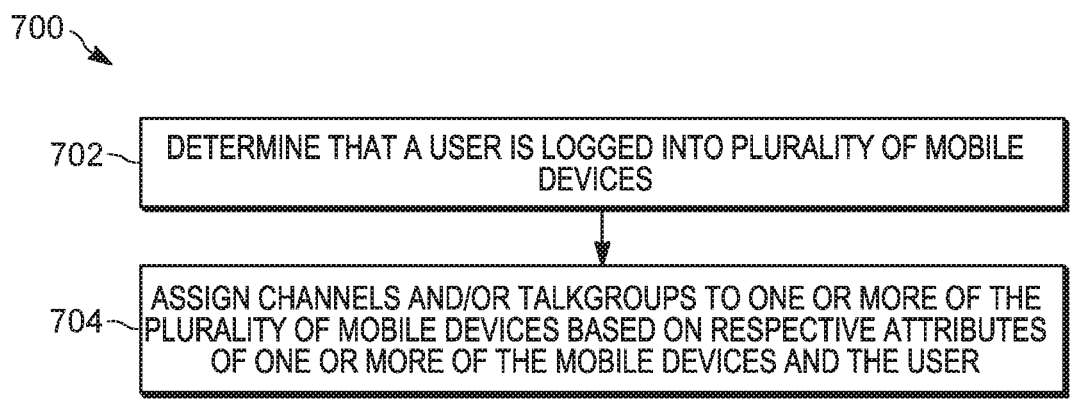
FIG. 7 is a method of managing channel and/or talkgroup assignments for a plurality of mobile devices that a user is logged into in accordance with some embodiments.

Hence, attention is now directed to FIG. 7 which depicts a flowchart representative of a method 700 for managing channel and/or talkgroup assignments for a plurality of mobile devices. The operations of the method 700 of FIG. 7 correspond to machine readable instructions that are executed by, for example, the device 200, and specifically by the controller 220 of the device 200. In the illustrated example, the instructions represented by the blocks of FIG. 7 are stored at the memory 222 for example, as one of the applications 223 for controlling the device 200 to operate according to a mode different from when another of the applications 223 is used to implement the method 400. Indeed, the method 700 of FIG. 7 is another way in which the controller 220 and/or the device 200 and/or the system 100 may be configured. Furthermore, the following discussion of the method 700 of FIG. 7 will lead to a further understanding of the system 100, and its various components. However, it is to be understood that the method 700 and/or the system 100 may be varied, and need not work exactly as discussed herein in conjunction with each other, and that such variations are within the scope of present embodiments.

The method 700 of FIG. 7 need not be performed in the exact sequence as shown and likewise various blocks may be performed in parallel rather than in sequence. Accordingly, the elements of method 700 are referred to herein as "blocks" rather than "steps." The method 700 of FIG. 7 may be implemented on variations of the system 100 of FIG. 1, as well.

The method 700 is further described with respect to the user 101 logging into the mobile device 300, which may include, but is not limited to, the user 101 logging into the portable radio 107. However, the user 101 may be logging into any mobile device of the system 100.

At a block 702, the controller 220 determines that the user 101 is logged into a plurality of mobile devices, such as each of the portable radio 107, the laptop 116 and the mobile communication device 133. The block 702 may occur by the controller 220 requesting a list of device identifiers associated with the user identifier 172 of the user 101 in the one or more databases 163. Such associations may occur when a user log-in process occurs at each of the plurality of mobile devices, similar to the log-in process described with respect to FIG. 5.

At a block 704, the controller 220 assigns channels and/or talkgroups to one or more of the plurality of mobile devices based on respective attributes of one or more of the mobile devices and the user. For example, the controller 220 may further request the user attributes of the list 185 from the one or more databases 163 and/or may further request device attributes of each of the plurality of the mobile devices from the one or more databases; the device attributes may be stored in a respective list for each of the plurality of mobile devices, each such list being similar to the list 186.

For example, channels and/or talkgroups may be assigned to one or more of the plurality of mobile devices based on one or more of:

A. Respective capabilities of the plurality of mobile devices. For example, a channel and/or talkgroup may be a secure channel and/or talkgroup; such a channel and/or talkgroup may be assigned to mobile devices with encryption capabilities. Similarly, a channel and/or talkgroup may be a group channel and/or talkgroup; such a channel and/or talkgroup may be assigned to mobile devices with group chat capabilities and/or is MBMS capabilities and/or eMBMS capabilities; indeed, such an assignment may also occur based on a number of participants in such a channel and/or talkgroup.

B. Respective accessories of the plurality of mobile devices. For example, a channel and/or talkgroup may be a video channel and/or talkgroup; such a channel and/or talkgroup may be assigned to mobile devices with video capability and/or video accessories which may include video accessories integrated with a mobile device and/or video accessories in communication with and/or mated to a mobile device.

C. Respective presence and/or operational statuses of the plurality of mobile devices. For example, a channel and/or talkgroup may be an emergency channel and/or talkgroup to be used for emergencies and/or in public safety incidents and/or in public safety incidents (e.g. disasters, etc.); such a channel and/or talkgroup may be assigned to mobile devices that have a presence and/or operational status in an "emergency" state (e.g. enabled to participate in emergency communications) and the like.

D. A respective location of the plurality of mobile devices, and/or a respective location of the user 101. For example, a channel and/or talkgroup may be a location specific channel and/or talkgroup, to be used in a given location and/or within a given geofence; such a channel and/or talkgroup may be assigned to mobile devices at the given location and/or within the given geofence.

Alternatively, a channel and/or talkgroup may be assigned to a mobile device that is at a location and/or geofence and/or area with a "most" number of users of a group channel and/or talkgroup; in other words, when a mobile device, of the plurality of mobile devices that the user 101 is logged into, is at a "critical site" where a large number of users in a talkgroup are also located, the channel and/or talkgroup may be assigned to that mobile device. Such a determination may be based on threshold numbers of users (and/or their respective mobile devices) being within a given distance of each other; a person of skill in the art understands that such a channel and/or talkgroup is also capable of group chats, and the like.

E. A last device used by the user 101 associated with the user identifier 172. For example, the one or more databases 163 may store an indication of a last device (e.g. of a plurality of mobile devices), which was used by the user 101, for example based on a most recent communication from the plurality of mobile devices, a most recent log-in to the plurality of mobile devices and the like.

Provided herein is a device, system and method for managing channel and/or talkgroup assignments. A memory stores a list of channels associated with a device identifier, and list of channels associated with a user identifier and user attributes. When the user identified by the user identifier, logs into a device identified by the device identifier, a subset of the list of channels associated with the device identifier is selected based on the user attributes, and assigned to the device, as well as the list of channels associated with the user identifier. Hence, the device may "inherit" the subset of the list of channels associated with the device identifier, access to which would otherwise be removed from the device upon user login.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A device comprising:
a communications unit; and
a controller communicatively coupled to the communications unit,
the controller having access to a memory storing:
a first list of channels associated with a device identifier that identifies a mobile device; and
a second list of channels associated with a user identifier that identifies a user;
the controller configured to:
receive, via the communications unit, from the mobile device, the user identifier indicating a log-in to the mobile device by the user, the user identifier further associated with one or more attributes of the user;
select a subset of the first list of channels, to be temporarily assigned to the mobile device when the user is logged into the mobile device, based on the one or more attributes of the user; and
transmit, via the communications unit, to the mobile device, a combined list that includes the subset of the first list of channels, and the second list of channels, to enable the mobile device to communicate using channels in the combined list.

2. The device of claim 1, wherein the one or more attributes of the user used by the controller to select the subset of the first list of channels include one or more of:
a role of the user;
a title of the user;
a rank of the user;
a position of the user in an organizational hierarchy;
an entity associated with the user; and,
an agency associated with the user.

3. The device of claim 1, wherein at least one channel in the first list of channels is tagged as being an always available channel, the subset of the first list of channels including the at least one channel.

4. The device of claim 1, wherein at least one channel in the first list of channels is tagged as being a never available channel, the subset of the first list of channels excluding the at least one channel.

5. The device of claim 1, wherein the controller is further configured to:
prior to receiving the user identifier indicating a log-in to the mobile device by the user:

receive, via the communications unit, from the mobile device, the device identifier indicating a user-independent log-in by the mobile device;

transmit, via the communications unit, to the mobile device, the first list of channels, to enable the mobile device to communicate using channels in the first list of channels; and after receiving the user identifier indicating a log-in to the mobile device by the user: transmit, via the communications unit, to the mobile device, the combined list, which causes the combined list to replace the first list of channels at the mobile device.

6. The device of claim 1, wherein each of the channels includes a respective talkgroup.

7. The device of claim 1, wherein the combined list comprises a common address book.

8. The device of claim 1, wherein the controller further has access to: a third list of addresses associated with the device identifier that identifies the mobile device; and a fourth list of addresses associated with the user identifier that identifies the user, wherein the controller is further configured to:

select a further subset of the third list of addresses, to be temporarily assigned to the mobile device when the user is logged into the mobile device, based on the one or more attributes of the user; and transmit, via the communications unit, to the mobile device, a further combined list that includes the further subset of the third list of addresses, and the fourth list of addresses, to enable the mobile device to access the further combined list.

9. The device of claim 1, wherein the controller is further configured to, when changes occur to the first list of channels:

generate an updated subset of the first list of channels based on the changes and the one or more attributes of the user; and transmit, via the communications unit, to the mobile device, at least the updated subset of the first list of channels.

10. The device of claim 1, wherein the controller is further configured to filter the combined list based on one or more of:

a capability of the mobile device;
accessories of the mobile device;
an operational status of the mobile device;
a location of the mobile device;
a number of participants in a respective channel of the combined list; and
whether the mobile device is a last device used by the user associated with the user identifier.

11. A method comprising:

receiving, at a controller, from a mobile device, a user identifier indicating a log-in to the mobile device by a user, the user identifier further associated with one or more attributes of the user, the controller having access to a memory storing: a first list of channels associated with a device identifier that identifies the mobile device; and a second list of channels associated with the user identifier that identifies the user;

selecting, at the controller, a subset of the first list of channels, to be temporarily assigned to the mobile device when the user is logged into the mobile device, based on the one or more attributes of the user; and transmitting, using the controller, to the mobile device, a combined list that includes the subset of the first list of channels, and the second list of channels, to enable the mobile device to communicate using channels in the combined list.

12. The method of claim 11, wherein the one or more attributes of the user used to select the subset of the first list of channels include one or more of:

a role of the user;
a title of the user;
a rank of the user;
a position of the user in an organizational hierarchy;
an entity associated with the user; and,
an agency associated with the user.

13. The method of claim 11, wherein at least one channel in the first list of channels is tagged as being an always available channel, the subset of the first list of channels including the at least one channel.

14. The method of claim 11, wherein at least one channel in the first list of channels is tagged as being a never available channel, the subset of the first list of channels excluding the at least one channel.

15. The method of claim 11, further comprising:

prior to receiving the user identifier indicating a log-in to the mobile device by the user:

receiving, at the controller, from the mobile device, the device identifier indicating a user-independent log-in by the mobile device;

transmitting, using the controller, to the mobile device, the first list of channels, to enable the mobile device to communicate using channels in the first list of channels; and after receiving the user identifier indicating a log-in to the mobile device by the user: transmitting, using the controller, to the mobile device, the combined list, which causes the combined list to replace the first list of channels at the mobile device.

16. The method of claim 11, wherein each of the channels includes a respective talkgroup.

17. The method of claim 11, wherein the combined list comprises a common address book.

18. The method of claim 11, wherein the controller further has access to: a third list of addresses associated with the device identifier that identifies the mobile device; and a fourth list of addresses associated with the user identifier that identifies the user, wherein the method further comprises:

selecting, at the controller, a further subset of the third list of addresses, to be temporarily assigned to the mobile device when the user is logged into the mobile device, based on the one or more attributes of the user; and transmitting, using the controller, to the mobile device, a further combined list that includes the further subset of the third list of addresses, and the fourth list of addresses, to enable the mobile device to access the further combined list.

19. The method of claim 11, wherein the method further comprises: when changes occur to the first list of channels:

generating, at the controller, an updated subset of the first list of channels based on the changes and the one or more attributes of the user; and transmitting, using the controller, to the mobile device, at least the updated subset of the first list of channels.

20. The method of claim 11, wherein the method further comprises filtering the combined list based on one or more of:
- a capability of the mobile device;
- accessories of the mobile device;
- an operational status of the mobile device;
- a location of the mobile device;
- a number of participants in a respective channel of the combined list; and
- whether the mobile device is a last device used by the user associated with the user identifier.

* * * * *